United States Patent
Jadric et al.

(10) Patent No.: US 7,208,891 B2
(45) Date of Patent: Apr. 24, 2007

(54) VARIABLE SPEED DRIVE FOR A CHILLER SYSTEM

(75) Inventors: Ivan Jadric, York, PA (US); Harold Robert Schnetzka, York, PA (US)

(73) Assignee: York International Corp., York, PA (US)

( * ) Notice: Subject to any disclaimer, the term of this patent is extended or adjusted under 35 U.S.C. 154(b) by 0 days.

(21) Appl. No.: 11/123,685

(22) Filed: May 6, 2005

(65) Prior Publication Data
US 2006/0250107 A1   Nov. 9, 2006

(51) Int. Cl.
*H02P 1/42*   (2006.01)
*H02P 23/00*   (2006.01)

(52) U.S. Cl. .................. 318/12; 318/727; 318/811; 318/599

(58) Field of Classification Search .............. None
See application file for complete search history.

(56) References Cited

U.S. PATENT DOCUMENTS

| | | |
|---|---|---|
| 3,593,103 A | 7/1971 | Chandler |
| 4,308,491 A | 12/1981 | Joyner, Jr. et al. |
| 4,855,652 A * | 8/1989 | Yamashita et al. .......... 318/268 |
| 4,935,684 A * | 6/1990 | Watanabe .................... 318/729 |
| 4,982,147 A * | 1/1991 | Lauw .......................... 318/729 |
| 5,081,368 A | 1/1992 | West |
| 5,123,080 A | 6/1992 | Gillett et al. |
| 5,127,085 A | 6/1992 | Becker et al. |
| 5,298,848 A | 3/1994 | Ueda et al. |
| 5,410,230 A | 4/1995 | Bessler et al. |
| 5,492,273 A * | 2/1996 | Shah ........................... 236/44 A |
| 5,592,058 A | 1/1997 | Archer et al. |
| 5,646,458 A | 7/1997 | Bowyer et al. |
| 5,652,485 A * | 7/1997 | Spiegel et al. .............. 318/147 |
| 5,731,681 A * | 3/1998 | Inaniwa et al. ............. 318/729 |
| 5,747,955 A | 5/1998 | Rotunda et al. |
| 5,793,623 A * | 8/1998 | Kawashima et al. ...... 363/56.05 |

(Continued)

FOREIGN PATENT DOCUMENTS

EP   0 272 776 A2   6/1988

(Continued)

OTHER PUBLICATIONS

Annabelle Van Zyl, Rene Spee, Alex Faveluke, and Shibashis Bhowmik; Voltage Sag Ride-Through for Adjustable-Speed Drives With Active Rectifiers; IEEE Transactions on Industry Applications; Nov./Dec. 1998; vol. 34, Issue No. 6.

(Continued)

*Primary Examiner*—Lincoln Donovan
*Assistant Examiner*—Renata McCloud
(74) *Attorney, Agent, or Firm*—McNees Wallace & Nurick LLC (57) ABSTRACT

A variable speed drive with a boost converter is provided for a chiller system driven by an induction motor. The boost converter can be a diode or thyristor rectifier followed by a boost DC/DC converter or a three-phase pulse width modulated boost converter. The boost converter provides a boosted voltage to the DC link, which results in a boosted voltage being applied to the induction motor by the inverter of the variable speed drive.

16 Claims, 4 Drawing Sheets

U.S. PATENT DOCUMENTS

| | | |
|---|---|---|
| 5,796,234 A | 8/1998 | Vrionis |
| 5,828,200 A * | 10/1998 | Ligman et al. ............. 318/807 |
| 5,869,946 A | 2/1999 | Carobolante |
| 5,905,643 A * | 5/1999 | Gopfrich et al. .............. 363/41 |
| 5,929,591 A * | 7/1999 | Katou et al. ................ 318/723 |
| 5,936,855 A | 8/1999 | Salmon |
| 5,969,966 A | 10/1999 | Sawa et al. |
| 5,970,733 A * | 10/1999 | Hamaoka et al. .......... 62/228.4 |
| 6,005,362 A | 12/1999 | Enjeti et al. |
| 6,072,302 A | 6/2000 | Underwood et al. |
| 6,075,328 A * | 6/2000 | Notohara et al. ........... 318/254 |
| 6,118,676 A | 9/2000 | Divan et al. |
| 6,160,722 A | 12/2000 | Thommes et al. |
| 6,204,627 B1 * | 3/2001 | Watanabe et al. .......... 318/729 |
| 6,239,513 B1 | 5/2001 | Dean et al. |
| 6,276,148 B1 | 8/2001 | Shaw |
| 6,313,600 B1 | 11/2001 | Hammond et al. |
| 6,348,775 B1 | 2/2002 | Edelson et al. |
| 6,367,273 B2 * | 4/2002 | Takagi et al. ................ 62/230 |
| 6,487,096 B1 | 11/2002 | Gilbreth et al. |
| 6,559,562 B1 | 5/2003 | Rostron |
| 6,686,718 B2 * | 2/2004 | Jadric et al. ................ 318/801 |
| 6,768,284 B2 | 7/2004 | Lee et al. |
| 6,801,019 B2 | 10/2004 | Haydock et al. |
| 2001/0035018 A1 * | 11/2001 | Takagi et al. .............. 62/228.4 |
| 2003/0015873 A1 | 1/2003 | Khalizadeh et al. |
| 2005/0057210 A1 | 3/2005 | Ueda et al. |
| 2005/0068001 A1 | 3/2005 | Skaug et al. |

FOREIGN PATENT DOCUMENTS

| | | |
|---|---|---|
| EP | 0 283 954 A2 | 9/1988 |
| EP | 0 313 366 A2 | 4/1989 |
| EP | 0 422 221 A1 | 11/1989 |
| EP | 1300937 A2 | 4/2003 |
| JP | 06105563 | 9/1992 |
| JP | 05068376 | 3/1993 |
| JP | 2002176767 | 6/2002 |
| JP | 04026374 | 9/2006 |
| WO | WO 97/32168 | 9/1997 |

OTHER PUBLICATIONS

Annette Von Jouanne, Prasad N. Enjeti, and Basudeb Banerjee; Assessment of Ride-Through Alternatives for Adjustable—Speed Drives: IEEE Transactions on Industry Applications; Jul./Aug. 1999; vol. 35, Issue No. 4.

* cited by examiner

VARIABLE SPEED DRIVE FOR A CHILLER SYSTEM

BACKGROUND OF THE INVENTION

The present invention relates generally to a variable speed drive for a chiller system. More specifically, the present invention relates to a variable speed drive with boost capability for a variable speed chiller system.

In the past, the motors for driving compressors in chiller systems were designed to operate from standard line (main) voltages and frequencies that were available from the power distribution system of the facility where the motor was being operated. The use of line voltages and frequencies typically limited the options for modulating the capacity of the compressors to less efficient mechanical devices such as inlet guide vanes and slide valves, as a result of the motor being limited to one operating speed that was based on the input frequency to the motor. In addition, if the operating speed of the motor was not equal to the desired operating speed of the compressor, a "step up," or "step down," gearbox was inserted between the motor and the compressor to obtain the desired operating speed of the compressor.

Next, variable speed drives (VSDs) were developed that could vary the frequency and voltage that was provided to the motors of a chiller system. This capability to vary the input frequency and voltage to a motor resulted in a motor that was capable of providing a variable output speed to the corresponding compressor of the chiller system. The variable speed operation of the motors (and compressors) enabled the chiller system to take advantage of efficiencies that occur during partial loading of the compressors, when operation at a speed lower than full load design speed is desirable. The use of the variable speed drive also permitted the use of other types of motors that required their own electronic drive in chiller systems in addition to the previous motors that were capable of operating directly from a three-phase power line, e.g., induction motors, or synchronous motors.

One limitation of prior induction motor style VSDs was that the magnitude of the fundamental output voltage from the VSD could be no larger than the magnitude of the input, or utility, line voltage to the VSD without creating an excessive amount of harmonic voltage. This limit on the fundamental output voltage occurred because the rectifier of the VSD only provided a DC voltage that is of a magnitude equal to approximately 1.3 times the root mean square (rms) value of the line-to-line AC voltage supplied to the VSD. This limitation on the output voltage of the variable speed drive limits the maximum speed of the conventional induction motor to a speed that corresponds to the speed of the motor operated at line voltage if constant volts/hertz ratio operation (also known as constant flux operation) was required. Constant volts/hertz ratio operation is needed by the conventional induction motor in order to deliver the motor's rated level of torque. Thus, to obtain greater compressor speeds, a "step up" gearing arrangement had to be incorporated between the motor and the compressor to increase the output rotational speed of the motor driving the compressor. Alternately one could operate a lower rated voltage motor at voltages and/or frequencies in excess of its rated voltage and frequency, provided the motor was capable of withstanding the rotational forces associated with such high-speed operation.

Prior induction motor style VSDs are also limited in their ability to provide ride-through capability that enables them to withstand temporary sags on the input line voltage. At full speed operation, the input line voltage sag was almost immediately reflected on the output voltage of the VSD, since the converter of the VSD contained no means to compensate for the input line voltage sag. The ability to withstand such temporary voltage sags of several seconds when operating at speeds close to maximum were thus limited, since the output voltage of the VSD is dependent upon the magnitude of the DC Link voltage, and thus the input voltage.

In addition, this limitation on the output voltage from the VSD limited the operating efficiency of high speed induction motors in the chiller system. The high speed motors, used to obtain faster compressor speeds without the "step up" gearing arrangement, were limited because it is more difficult to design an efficient and cost-effective motor when a reduced maximum operating voltage was available at the maximum operating speed.

Therefore, what is needed is a variable speed drive for a motor, with improved ride-through capability, and that can provide a cost-effective, efficient and easily implemented operation of the high speed induction motor in a chiller system.

What is also needed is a variable speed drive that is capable of driving a motor that is rated for operating voltages in excess of the nominal input line fixed AC voltage.

SUMMARY OF THE INVENTION

One embodiment of the present invention is directed to a drive system for a compressor of a chiller system. The drive system has a variable speed drive and a motor. The variable speed drive is configured to receive an input AC voltage at a fixed AC input voltage and provide output AC power at a variable voltage and variable frequency. The variable speed drive including a converter stage connected to an AC power source providing the input AC voltage, a DC link connected to the converter stage, and an inverter stage connected to the DC link. The converter stage is configured to convert the input AC voltage to a boosted DC voltage. The DC link is configured to filter the boosted DC voltage and store the energy from the converter stage. The inverter stage is configured to convert the boosted DC voltage from the DC link into the output AC power having the variable voltage and the variable frequency. The motor, preferably an induction motor, is connected to the inverter stage and is powered by the output of the inverter stage. The motor is connectable to a compressor of a chiller system to power the compressor. The converter is configured to provide ride-through capacity by maintaining the boosted DC voltage level during a sag in the input AC voltage.

One advantage of the present invention is increased system efficiency and potential cost reduction by eliminating gears between the motor and the compressor.

Another advantage of the present invention is a reduction in motor and inverter losses.

A further advantage of the present invention is improved reliability of the chiller system.

Another advantage of the present invention is improved input power quality in the variable speed drive.

Still another advantage of the present invention is that the variable speed drive has improved ride-through capabilities during input voltage sags.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
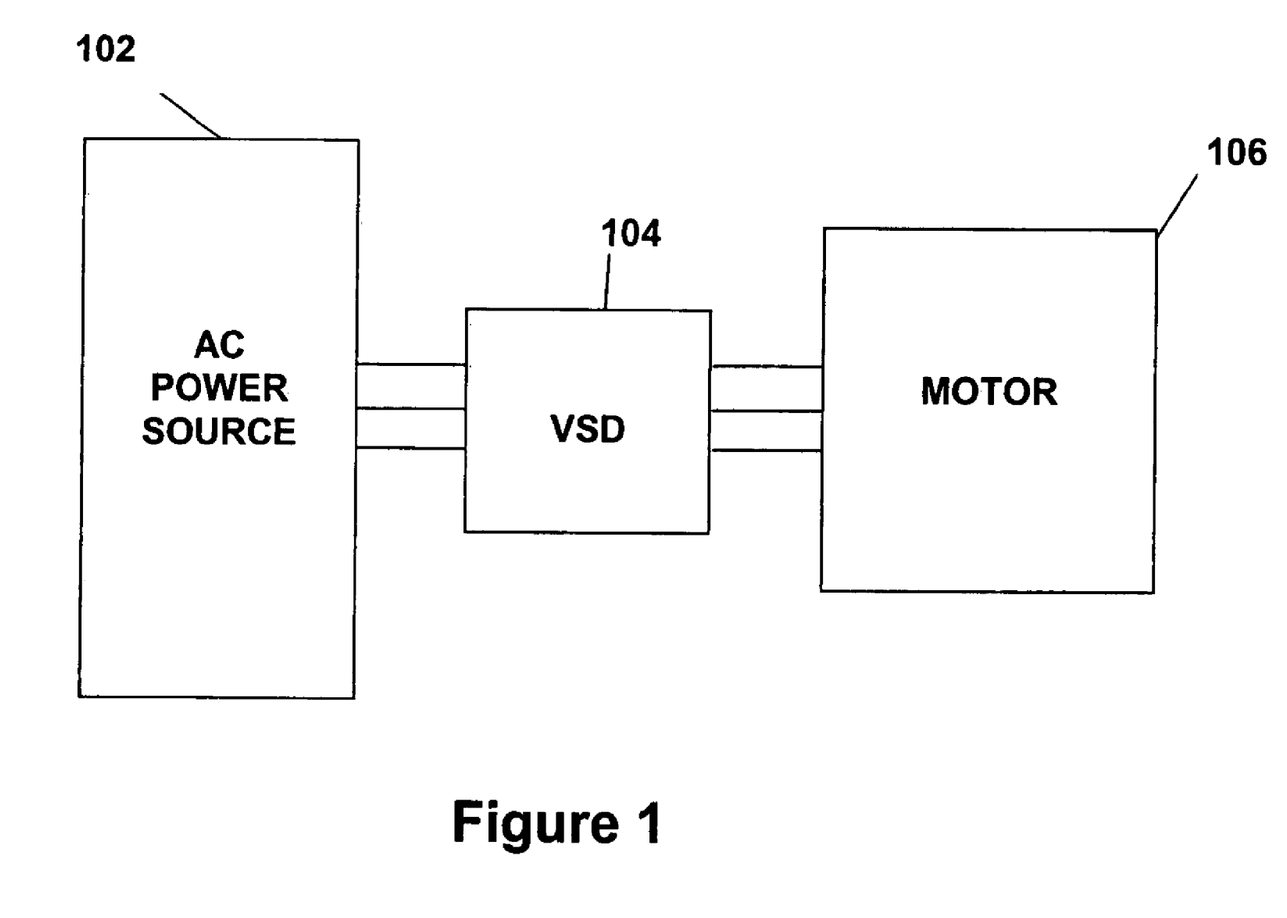
FIG. 1 illustrates schematically a general system configuration of the present invention.

FIG. 1 illustrates generally the system configuration of the present invention. An AC power source 102 supplies AC power to a variable speed drive (VSD) 104, which in turn, supplies AC power to a motor 106. In another embodiment of the present invention, the VSD 104 can power more than one motor. The motor 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power grid can be supplied directly from an electric utility or can be supplied from one or more transforming substations between the electric utility and the AC power grid. The AC power source 102 can preferably supply a three phase AC voltage or nominal line voltage of 200 V, 230 V, 380 V, 460 V, or 600 V, at a nominal line frequency of 50 Hz or 60 Hz to the VSD 104 depending on the corresponding AC power grid. It is to be understood that the AC power source 102 can provide any suitable fixed nominal line voltage or fixed nominal line frequency to the VSD 104 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

Figure 2:
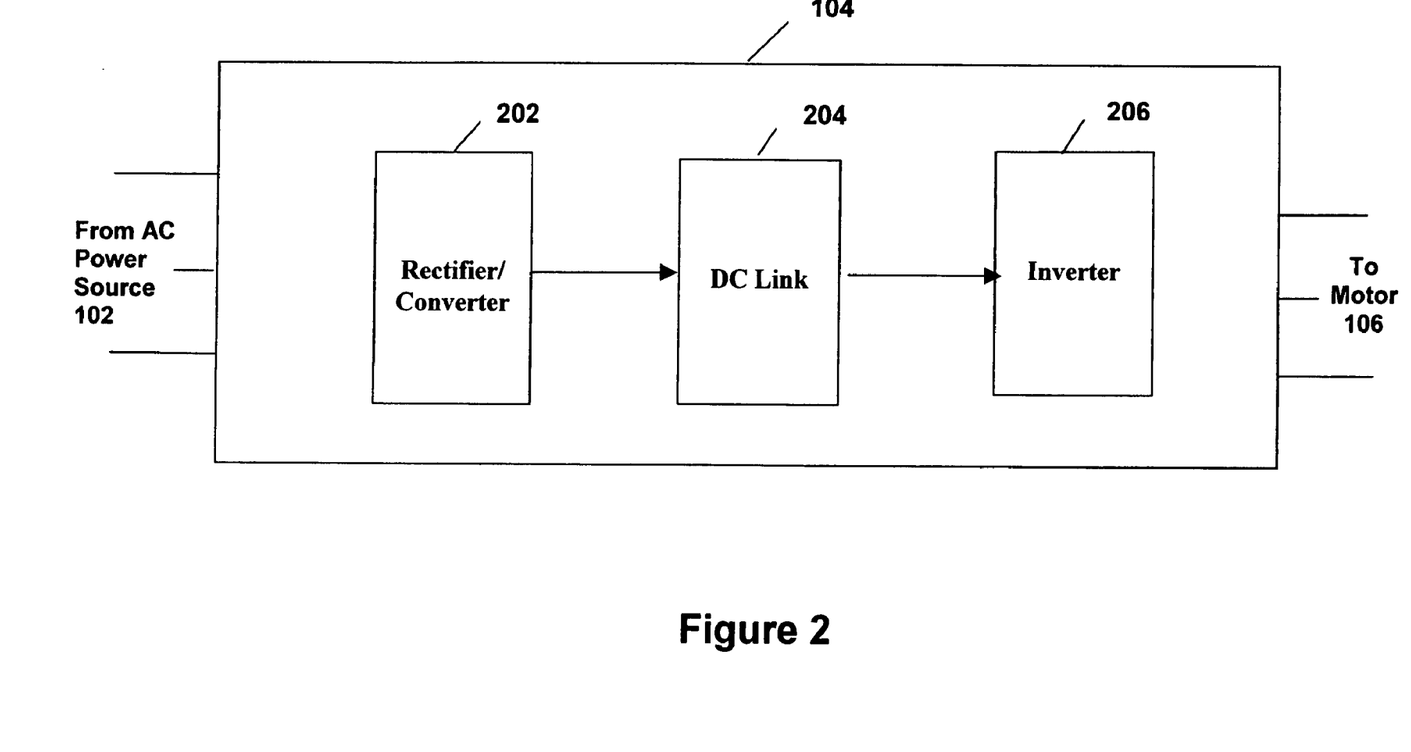
FIG. 2 illustrates schematically an embodiment of variable speed drive of the present invention.

The VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the AC power source 102. The motor 106 may have a predetermined rated voltage and frequency that is greater than the fixed AC input voltage and frequency, however the rated motor voltage and frequency may also be equal to or lower than the fixed AC input voltage and frequency. FIG. 2 illustrates schematically some of the components in one embodiment of the VSD 104. The VSD 104 can have three stages: a converter stage 202, a DC link stage 204 and an inverter stage 206. The converter 202 converts the fixed line frequency, fixed line voltage AC power from the AC power source 102 into DC voltage. The DC link 204 filters the DC voltage from the converter 202 and provides energy storage components such as capacitors and/or inductors. Finally, the inverter 206 converts the DC voltage from the DC link 204 into variable frequency, variable voltage AC power for the motor 106.

Figure 3:
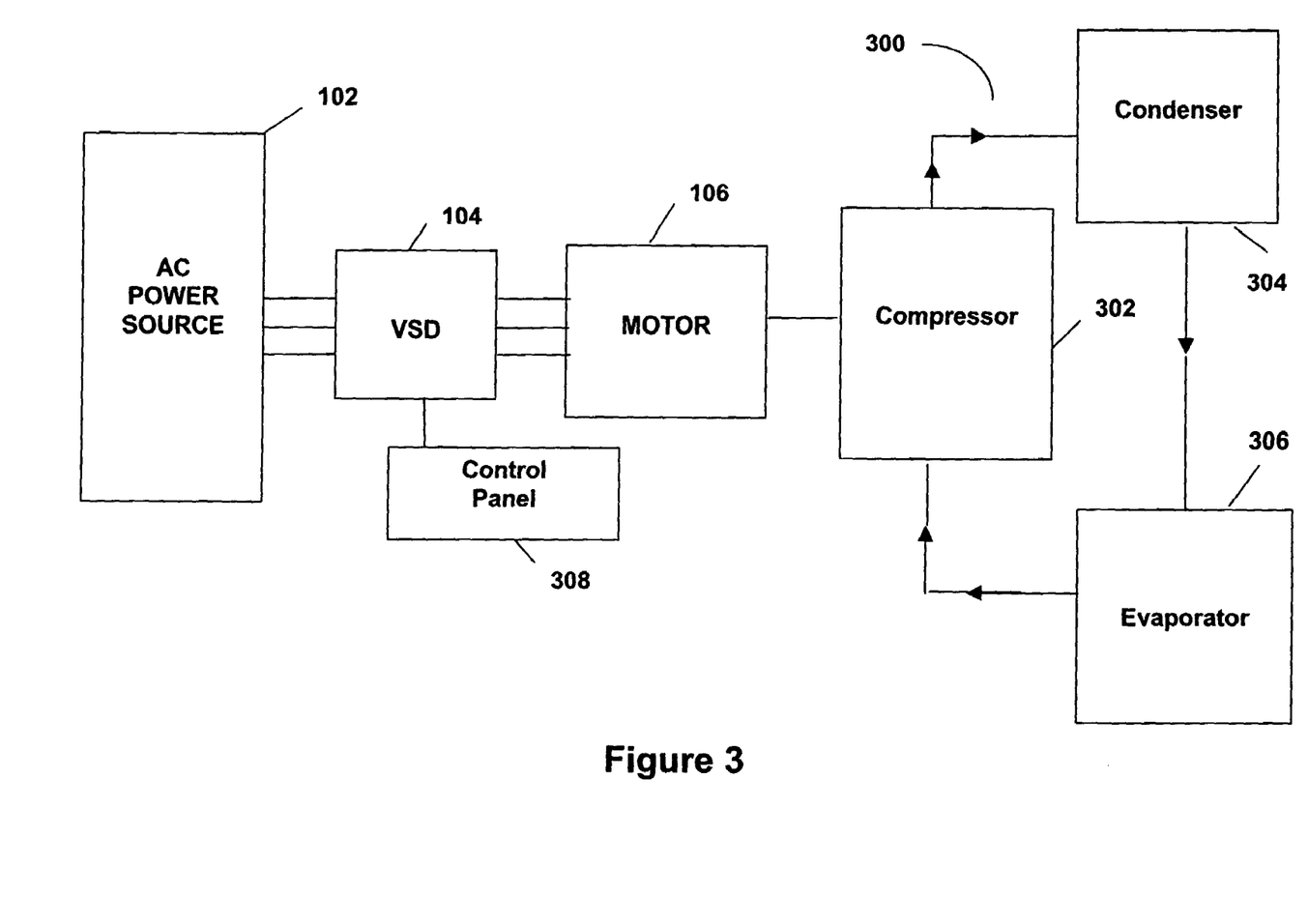
FIG. 3 illustrates schematically a refrigeration system that can be used with the present invention.

The motor 106 is preferably an induction motor that is capable of being driven at variable speeds. The induction motor can have any suitable pole arrangement including two poles, four poles or six poles. The induction motor is used to drive a load, preferably a compressor as shown in FIG. 3. In one embodiment of the present invention, the system and method of the present invention can be used to drive a compressor of a refrigeration system. FIG. 3 illustrates generally the system of the present invention connected to a refrigeration system.

As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can be used to control the operation of the VSD 104 and the motor 106, as well as other components of the chiller system 300.

Compressor 302 compresses a refrigerant vapor and delivers the vapor to the condenser 304 through a discharge line. The compressor 302 is preferably a centrifugal compressor, but can be any suitable type of compressor, e.g., screw compressor, reciprocating compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The evaporator 306 includes connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs, connected into each of one or more refrigerant circuits.

Preferably, a control panel, microprocessor or controller can provide control signals to the VSD 104 to control the operation of the VSD 104 (and thereby the motor 106) to provide the optimal operational setting for the VSD 104 and motor 106 depending on the particular sensor readings received by the control panel. For example, in the refrigeration system 300 of FIG. 3, the control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired load output of the compressor 302.

Referring back to FIG. 2, the converter 202 is a pulse width modulated boost rectifier having insulated gate bipolar transistors (IGBTs) to provide a boosted DC voltage to the DC link 204 to obtain an output voltage from the VSD 104 greater than the input voltage of the VSD 104. In a preferred embodiment of the present invention, the VSD 104 can provide a maximum output voltage that is greater than the fixed input voltage provided to the VSD 104 and a maximum output frequency that is greater than the fixed input frequency provided to the VSD 104. Furthermore, it is to be understood that the VSD 104 can incorporate different components from those shown in FIG. 2 so long as the VSD 104 can provide the motor 106 with appropriate output voltages and frequencies.

In addition to providing a boosted DC voltage to the DC link 204, the converter 202 can control the shape and phase angle of the current waveform that is drawn from the AC power source 102 to improve the input power quality of the VSD 104. The quality of the input power can be determined by evaluating two characteristics. One characteristic is the shape of the waveform of the currents drawn from the AC power source 102, where the closer or nearer the waveform shape is to the ideal sinusoid, the better the quality of the input power. The other characteristic is the power factor of the input power, i.e., the cosine of the phase angle between the supplied AC input voltage and the fundamental harmonic component of the current drawn from the AC power source 102, where the closer or nearer the power factor is to unity, the better the quality of the input power. The converter 202 is able to control the shape and phase angle of the current wave drawn from the AC power source 102 such that the shape of the waveform is sinusoidal and substantially in phase with the AC input voltage. Thus, the converter 202 enables the VSD 104 to have improved input power quality.

Furthermore, the converter 202 can be used to improve the ride-through capabilities of the VSD 104 during a decrease of the AC input voltage, also referred to as a voltage sag. The converter 202 can be controlled to provide a desired or predetermined output voltage to the DC link 204 that is substantially independent of and greater than the peak of the AC input voltage. By providing a DC voltage that is not dependent on the AC input voltage, the converter 202 (and VSD 104) is unaffected by voltage sags in the AC input voltage and thereby provides improved ride-through performance for the VSD 104. The converter 202 can continue to provide the desired DC voltage to the DC link 204, even though the AC input voltage has sagged. This ride-through capability of the converter 202 enables the VSD 104 to continue to operate without interruption during times when the AC input voltage sags.

Figure 4:
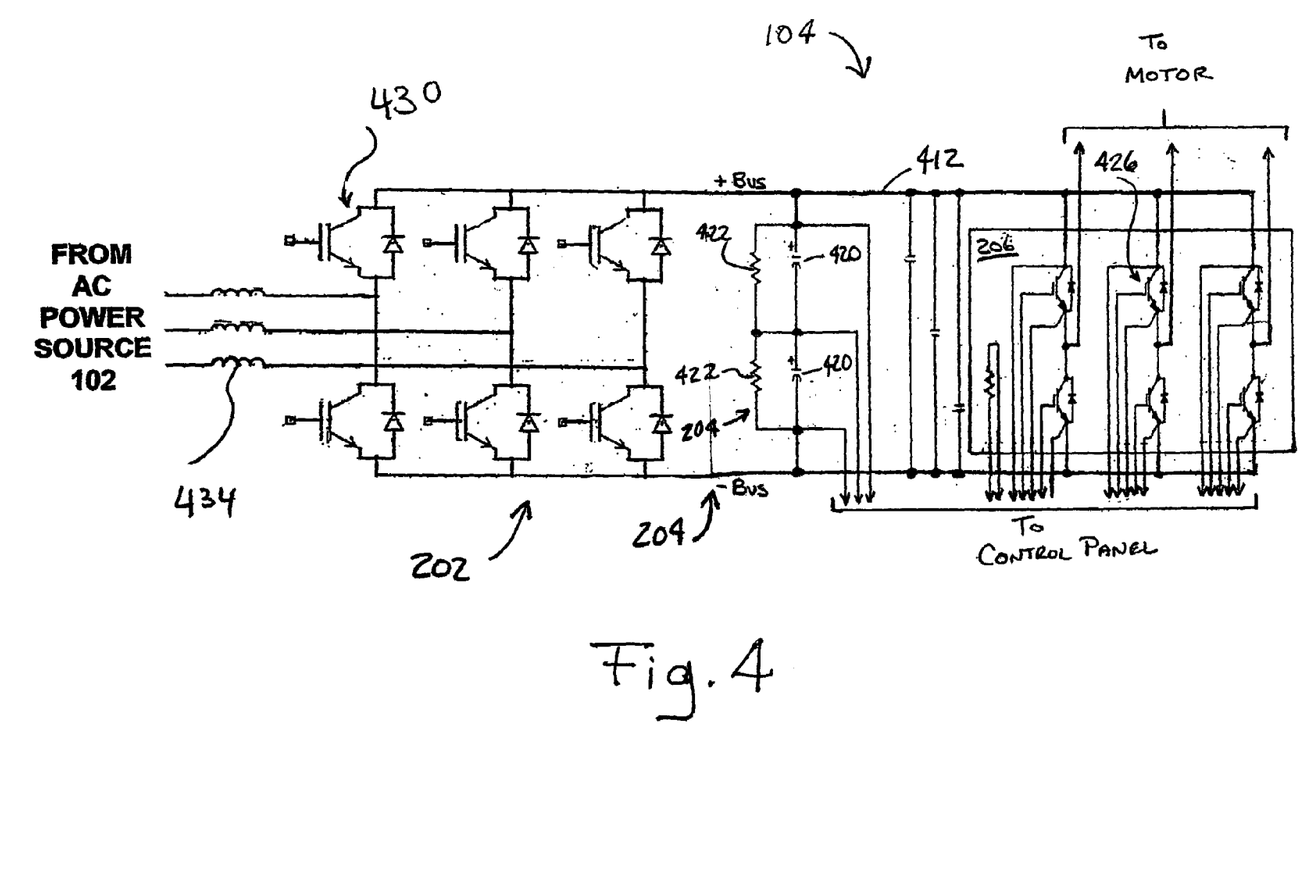
FIG. 4 illustrates a circuit diagram of one embodiment of the variable speed drive of the present invention.

FIG. 4 shows a circuit diagram for one embodiment of the VSD 104. In this embodiment of the VSD 104, the input lines from a three-phase AC power source 102 are connected to inductors 434 that are used to smooth the current in the corresponding line of the VSD 104. The output of each of the inductors 434 is then provided to the converter 202 to convert each phase of the input AC voltage to DC power. In addition, the VSD 104 can include additional components located upstream of the inductors 434 that are not shown in FIG. 4. For example, a circuit breaker can be included, which circuit breaker can disconnect the VSD 104 from the AC power source 102 when an excess current, voltage or power is provided to the VSD 104. Pre-charge resistors and contactors can be included to slowly charge the DC Link capacitors. Finally, fuses for each line can be used to disconnect that input phase or line of the VSD 104 in response to an excessive current in that line.

The converter module 202 preferably includes three pairs (one pair for each input phase) of power switches or transistors 430. The converter module 202 also includes the corresponding control connections (not shown for simplicity) to control the switching of the power switches 430. In a preferred embodiment of the converter module 202, the power switches are IGBT power switches that are controlled by a pulse width modulation technique to generate the desired output voltages for the DC link. Preferably, the converter module 202 can operate as a boost rectifier to provide a boosted DC voltage to the DC link 204 to obtain a fundamental output voltage from the VSD 104 greater than the input voltage of the VSD 104. Multiple converter modules may also be configured in parallel to increase the current capability of the converter.

Connected in parallel to the outputs of the converter 202 is the DC link 204. The DC link 204 in this embodiment includes capacitor(s) 420 and resistors 422 to filter the DC power and store energy from a DC bus 412. The resistors can function as voltage balancing devices to maintain a substantially equal DC link voltage between capacitor banks. The resistors can also function as charge depleting devices to "bleed off" stored voltage in the capacitor banks when the power is removed from the AC power source 102. Also connected to the DC bus 412 is an inverter section 206, which converts the DC power on the DC bus 412 to three phase AC power for the motor 106. In the embodiment shown in FIG. 4, one inverter section or module 206 is used to drive a single motor. However, additional inverter modules 206 can be added to drive additional motors, and would have a similar circuit representation to the inverter module 206 shown in FIG. 4.

The inverter module 206 includes three pairs (one for each output phase) of insulated gate bipolar transistor (IGBT) power switches 426 and diodes. The inverter modules 206 also include the corresponding control connections to control the switching of the IGBT power switches 430

The inverter module 206 converts the DC voltage on the DC bus 412 to three phase AC voltage by selectively switching each of the IGBT power switches 426 in the inverter module 206 between an "on" or activated position and an "off" or deactivated position using a modulation scheme to obtain the desired AC voltage and frequency from the inverter module 206. A gating signal or switching signal is provided to the IGBT power switches 426 by the control panel 308, based on the modulation scheme, to switch the IGBT power switches 426 between the "on" position and the "off" position. The IGBT power switches 426 are preferably in the "on" position when the switching signal is "High," i.e., a logical one, and in the "off" position when the switching signal is "Low," i.e., a logical zero. However, it is to be understood that the activation and deactivation of the IGBT power switches 430 can be based on the opposite state of the switching signal.

By providing a boosted DC voltage to the DC link 204 with the converter 202, the magnitude of the DC and RMS current into the inverter 206 is reduced, which inverter current is approximately inversely proportional to the DC input voltage of the inverter 206 for a given system power rating. This reduction in inverter current results in a reduction of inverter losses for the VSD 104 for a given fundamental output voltage. The reduction of inverter losses in the VSD 104 results in increased efficiency for the chiller system 300.

Finally, the ability of the VSD 104 to adjust both the maximum output voltage and maximum output frequency delivered by the VSD 104 to the motor 106, substantially independently of the nominal AC input voltage and nominal AC input frequency to the VSD, permits the VSD 104 to be operated on a variety of foreign and domestic power grids without having to alter the motor 106 or the VSD 104 for different power sources.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive system for a compressor of a chiller system, the drive system comprising:
    a variable speed drive, the variable speed drive being configured to receive an input AC voltage at a fixed AC input voltage and provide an output AC power at a variable voltage and variable frequency, the variable speed drive comprising:
        a converter stage connected to an AC power source providing the input AC voltage, the converter stage being configured to convert the input AC voltage to a boosted DC voltage;
        a DC link connected to the converter stage, the DC link being configured to filter and store the boosted DC voltage from the converter stage; and
        an inverter stage connected to the DC link, the inverter stage being configured to convert the boosted DC voltage from the DC link into the output AC power having the variable voltage and the variable frequency; and
    a motor connected to the inverter stage and powered by the output AC power from the inverter stage, the motor being connectable to a compressor of the chiller system to power the compressor;
    wherein the converter stage comprises a three-phase pulse width modulated boost rectifier having insulated gate bipolar transistors and is configured to maintain a boosted DC voltage greater than the input AC voltage when the input AC voltage falls below the fixed AC input voltage.

2. The drive system of claim 1 wherein the boosted DC voltage is a DC voltage greater than 1.3 times the root-mean-squared value of the fixed AC input voltage.

3. The drive system of claim 1 wherein the motor has a voltage rating greater than the fixed input AC voltage.

4. The drive system of claim 1 wherein the converter stage is configured to control a current waveform drawn from the AC power source to have a substantially sinusoidal shape and to be substantially in phase with the fixed input AC voltage.

5. The drive system of claim 1 wherein the converter stage is configured to provide the boosted DC voltage to the DC link substantially independent of the fixed input AC voltage, thereby permitting the variable speed drive to operate during a reduction in the fixed input AC voltage for a predetermined time.

6. The drive system of claim 1 wherein the inverter stage is configured to have a DC current of reduced magnitude in response to the boosted DC voltage being present at the DC link, thereby reducing inverter losses in the variable speed drive.

7. The drive system of claim 1 wherein the motor is configured to have a motor current having a RMS value of reduced magnitude in response to the variable voltage being greater than the fixed input AC voltage, thereby reducing motor losses in the motor.

8. The drive system of claim 1, wherein the motor is an induction motor.

9. A chiller system comprising:
    a compressor, a condenser, and an evaporator connected in a closed refrigerant loop;
    a motor connected to the compressor to power the compressor; and
    a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:
        a converter stage connected to an AC power source providing the input AC power, the converter stage being configured to convert the input AC voltage to a boosted DC voltage, the boosted DC voltage being greater than the fixed input AC voltage;
        a DC link connected to the converter stage, the DC link being configured to filter the boosted DC voltage and store energy from the converter stage;
        an inverter stage connected to the DC link, the inverter stage being configured to convert the boosted DC voltage from the DC link into the output power for the motor having the variable voltage and the variable frequency; and
    wherein the converter stage comprises a three-phase pulse width modulated boost rectifier having insulated gate bipolar transistors.

10. The chiller system of claim 9 wherein the boosted DC voltage is a DC voltage greater than 1.3 times the root-mean-squared value of the fixed AC input voltage.

11. The chiller system of claim 9 wherein the motor has a voltage rating greater than the fixed input AC voltage.

12. The chiller system of claim 9 wherein the converter stage is configured to control a current waveform drawn from the AC power source to have a substantially sinusoidal shape and to be substantially in phase with the fixed input AC voltage.

13. The chiller system of claim 9 wherein the converter stage is configured to provide the boosted DC voltage to the DC link substantially independent of the fixed input AC voltage, thereby permitting the variable speed drive to operate during a reduction in the fixed input AC voltage for a predetermined time.

14. The chiller system of claim 9 wherein the motor is configured to have a motor current having a RMS value of reduced magnitude in response to the variable voltage being greater in magnitude than the fixed input AC voltage, thereby reducing motor losses in the motor.

15. The chiller system of claim 9 wherein the inverter stage is configured to have a DC current of reduced magnitude in response to the boosted DC voltage being present at the DC link, thereby reducing inverter losses in the variable speed drive.

16. The chiller system of claim 9 wherein the motor is an induction motor.

* * * * *